Dec. 12, 1950    W. G. HARDY    2,533,244
MECHANICALLY-OPERATED ANTISKID
DEVICE FOR VEHICLE WHEELS
Filed Feb. 1, 1949    3 Sheets-Sheet 2
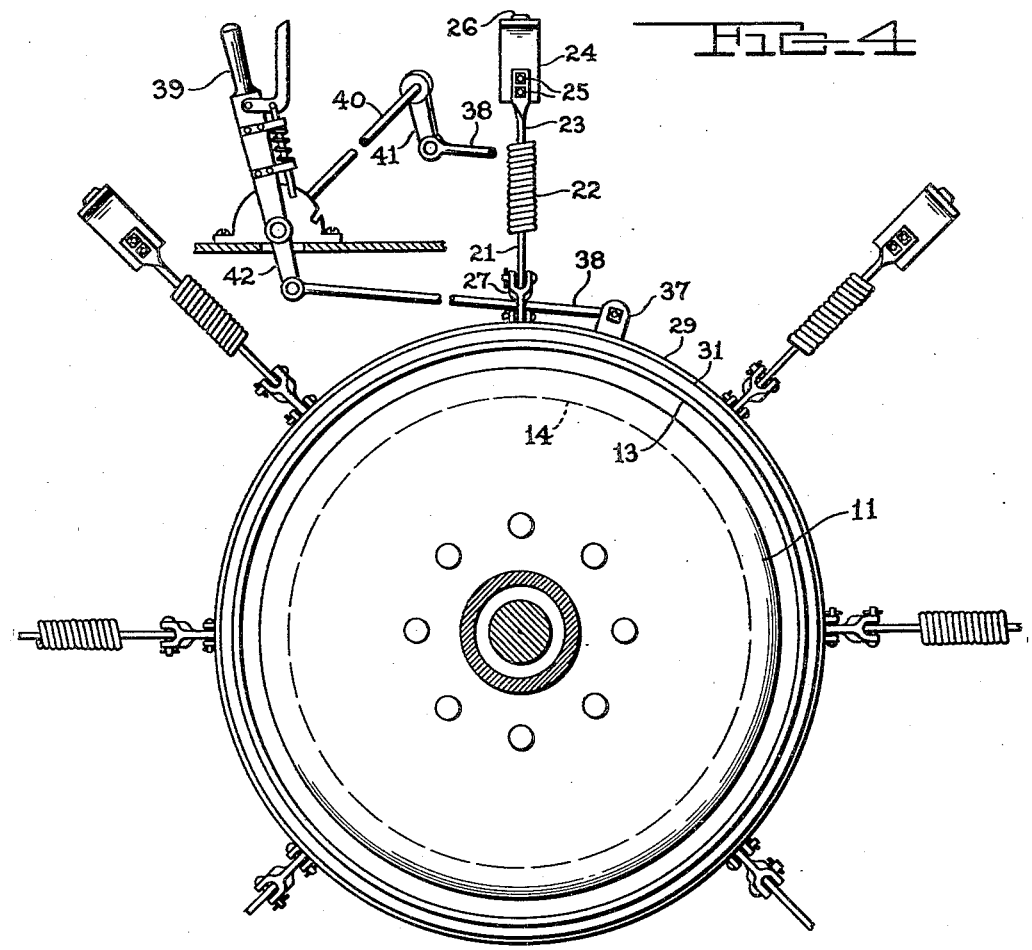
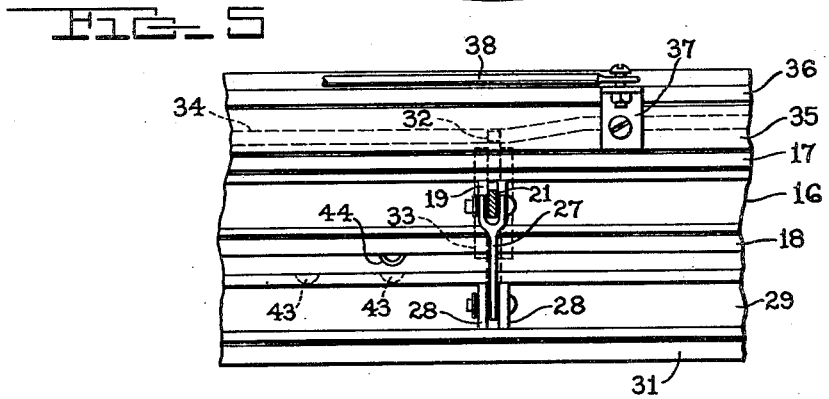
INVENTOR.
WILLIAM GEORGE HARDY
BY
ATTORNEY

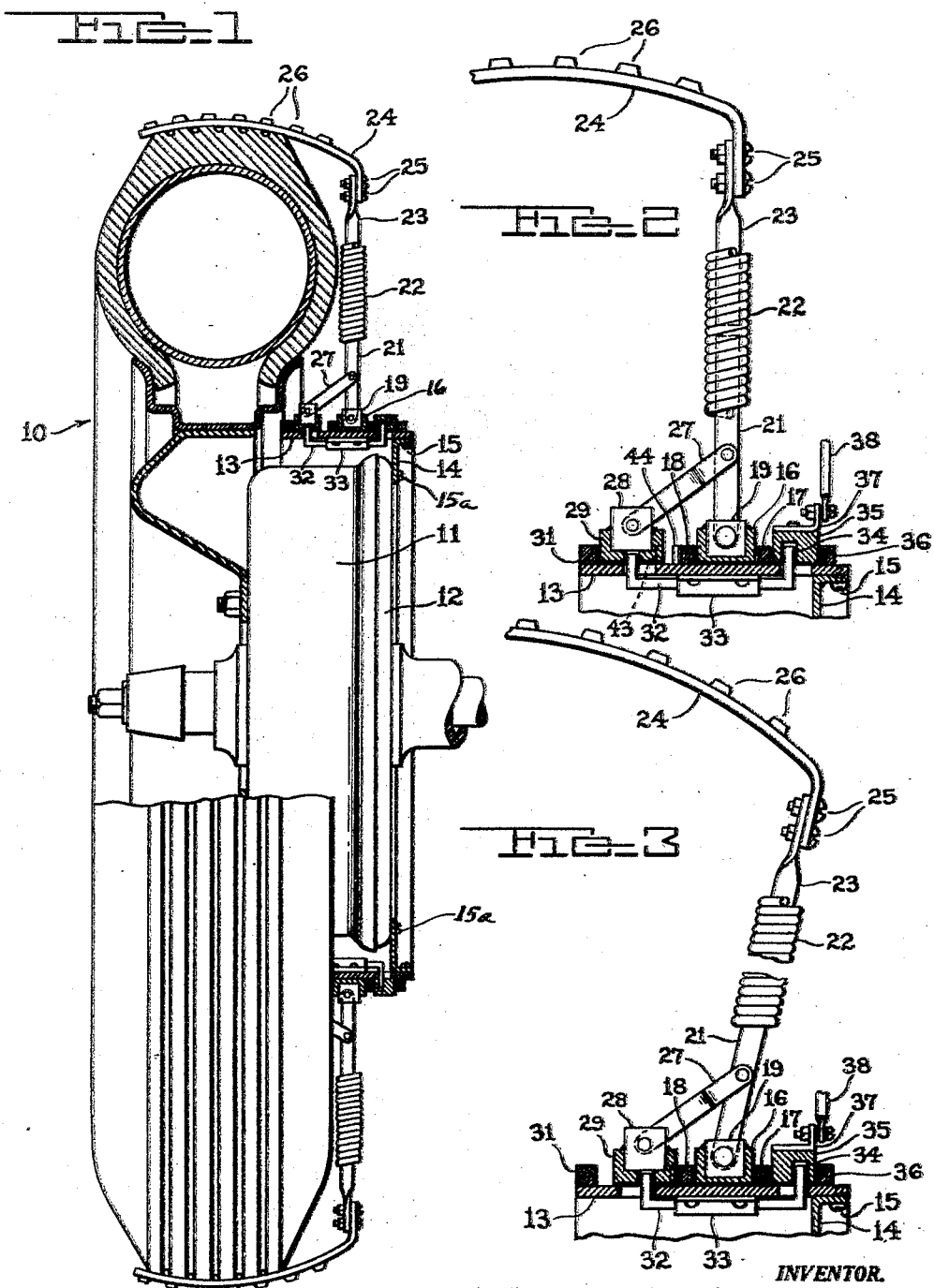

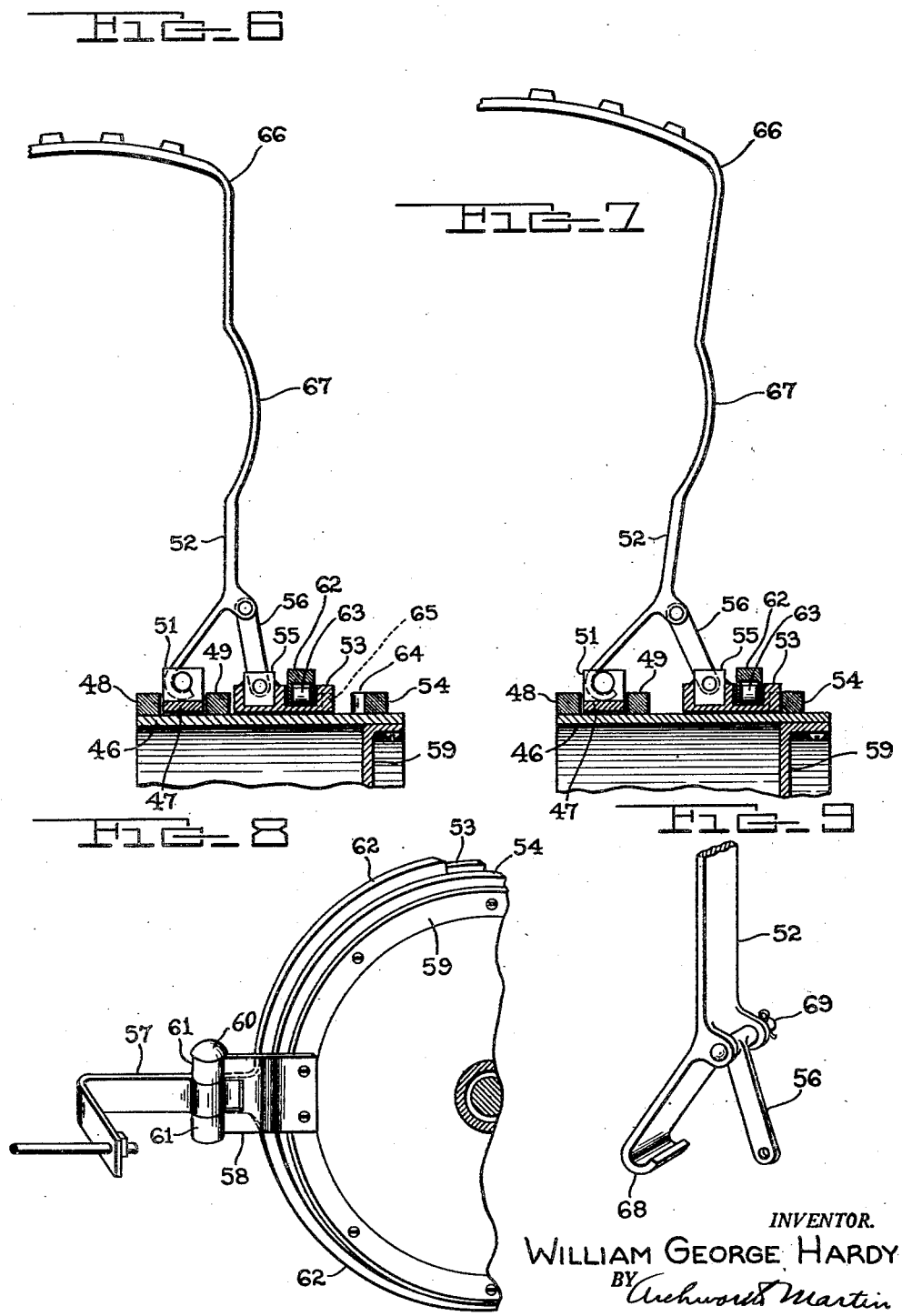

Patented Dec. 12, 1950

2,533,244

UNITED STATES PATENT OFFICE 2,533,244

MECHANICALLY OPERATED ANTISKID DEVICE FOR VEHICLE WHEELS

William George Hardy, Pittsburgh, Pa., assignor to The McKay Company, Pittsburgh, Pa., a corporation of Pennsylvania Application February 1, 1949, Serial No. 73,886

4 Claims. (Cl. 152—214)

My invention relates to anti-skid devices that are particularly suitable for use on wheels of motor vehicles and which can readily be applied to various existing models of vehicles, simply through removal of the wheel, and which will remain in place either permanently or during the winter season, the anti-skid elements or cleats being readily movable into and out of operative position on the tire tread.

One object of my invention is to provide a cleat mounting of such form that it will be adequate as an anti-skid device and nevertheless have such flexibility or yieldability as to resist deformation under tractive stresses.

Another object of my invention is to provide a cleat connected only at one end, to a supporting member or arm that has such torsional resistance to displacement of the free end of the cleat under tractive stresses that the cleat can swing to a limited degree under such stresses and will be returned to normal position crosswise of the tire tread when it is carried out of contact with the roadway.

Still another object of my invention is to provide a simplified and improved form of mechanism for moving the cleats into and out of operative positions upon the tire tread.

Some of the forms which my invention may take are shown in the accompanying drawings wherein Figure 1 is a cross sectional view showing my device applied to a vehicle wheel; Fig. 2 is an enlarged view of a portion of the structure of Fig. 1; Fig. 3 is a similar view but showing the cleat element in its inoperative or withdrawn position; Fig. 4 is an inner face view of a portion of the structure of Fig. 1; Fig. 5 is a fragmentary plan view of the structure of Fig. 3; Figs. 6 and 7 show modifications of the device of Figs. 2 and 3 respectively; Fig. 8 is a fragmentary view showing the apparatus for shifting the cleat of Figs. 6 and 7, and Fig. 9 is an enlarged detailed view of the cleat arm and the pull link for swinging the arm.

Referring first to Figs. 1 to 5, an automobile wheel is represented by the numeral 10, the wheel being secured to a brake drum 11 of conventional form. The axle housing carries a radial plate 12 on which the assembly is mounted.

The cleat assembly and the operating mechanism therefor comprises a bracket or base 13 for supporting the operating members of the apparatus in unitary relation. This base 13 is of cylindrical form and can be inserted in concentric relation to the brake drum 11 when the wheel is removed. The base 13 is secured to a bracket ring 14 of ring-like and angular form, by screws 15, the bracket ring 14 being, in turn, secured to the plate 12 by screws 15a. The ring 14 is split or made in halves so that it can be placed around the axle housing preliminary to attaching it to the plate 12.

A cleat-carrying ring 16 is rotatable on the base 13, between ribs 17 and 18 that are rigidly secured to the base. At intervals around the periphery of the ring 16, ears or flanges 19 are provided for pivotally supporting cleat-carrying arm members 21. These ears 19 are so spaced that there is a sufficient clear space at one zone when the cleats are in inoperative position that they will be clear of the roadway, as indicated at the lower portion of Fig. 4.

The portion 21 of the cleat arm has rigid connection with one end of a stiff pretensioned coil spring 22 whose upper end is rigidly connected to a cleat-arm member 23. Cleats 24 are connected to the arm members 23 by suitable means such as bolts 25, so that worn cleats can be replaced readily. Under driving stresses, the free ends of the cleats 24 will tend to swing or be angularly displaced somewhat, by the tractive forces. Also, the cleats 24 are preferably made of spring metal, with hardened inserts or studs 26. The flexibility of the cleats together with deformation of the springs 22 under tractive thrusts allows the outer ends of the cleats to swing or skew somewhat, thus easing stresses on the cleats. As soon as each cleat passes out of engagement with the roadway, it will, by reason of the resiliency of its spring 22 and its own inherent resiliency, spring back to crosswise position on the tire. The cleats can be made much wider than indicated in Fig. 4, but any tendency of snow to accumulate and build up between the cleat and the tire tread will be overcome by the skewing movements above referred to.

Links 27 are provided for swinging the cleat arms to their operative positions as shown in Fig. 2 and to their release positions as shown in Fig. 3. The upper ends of these links are pivotally connected to these bars 21, and at their lower ends, they are pivotally connected to ears 28 that are rigidly secured to a link-carrying ring 29 which is rotatable on the base 13. The link-carrying ring 29 is positioned between an annular guide rib 31 and the annular guide rib 18 and is provided with an annular slot on its inner surface to receive an upturned end of a slide bar 32 that is slidably supported in a bracket 33 on the inner surface of the base 13. The upturned inner end of the bar 32 extends into a slot 34 in a cam ring 35 that is oscillatable on the base 13, the cam ring 35 being positioned between the guide rib 17 and the guide rib 36, and the cam slot being shown more clearly in Fig. 5. An angular bracket 37 is secured to the ring 35 for connection to a pull rod 38 that can be operated from the driver's seat of a vehicle by a hand lever 39 which is connected through a rock shaft 40 and crank arms 41 and 42 with the pull rods 38 at either side of the vehicle.

When the pull rods 38 are moved in one direction, the cam ring will slide the bar 32 in a direction to swing the cleats into position across the tire as shown in Figs. 1 and 2, while movement in the opposite direction will swing them to the release position of Fig. 3. When the ring 29 that carries the operating links 27 is swung in a direction to move the cleats from the tire tread, one of the recesses 43 in a face of the ring will be brought into position to be engaged by a bowed leaf spring 44 that is secured to the rib 18. These recesses and the spring are so positioned that the rings 17, 29 will be yieldably held against idling movement when the cleats are released from the tire, as shown in Fig. 3, and the widest cleat space between the cleats is at the bottom of the structure as indicated in Fig. 4, at which position the cleats will be clear of the roadway. If one of the cleats encounters an obstruction such as a curb or a rut, the cleat structure will be rotated until the spring 44 is again encountered by one of the recesses 43. I provide two recesses 43, so that if the momentum of the rings 17 and 29 are so great, when the cleats are released from the wheel, as to carry the first notch 43 past the spring, the spring will be engaged by the second notch 43.

Referring now to Figs. 6 to 9, I show an arrangement wherein the cylindrical base 46 is mounted around a brake drum in the same manner as the member 13. In this arrangement however, the cleat-carrying ring 47 is mounted near the outer edge of the base member, between guide ribs 48 and 49. The cleat ring has ears 51 for pivotally supporting cleat arms 52. A ring 53 is rotatably mounted on the base member and is shiftable axially thereof between the guide rib 49 and a guide rib 54. The ring 53 has ears 55 to which operating links 56 are pivotally connected, the upper ends of the links being pivotally connected to the cleat arms 52.

A bell-crank lever 57 is pivotally mounted on a bracket 58 that is secured to a bracket ring 59 that corresponds to the ring 14 of Figs. 1 to 3. The forward end of this bracket is divided and has knuckles 61 formed thereon to receive a pintle 60 on the lever 57 and thus provide for a hinge joint. The rear end of the lever 57 has forked extensions 62 each of which carries a stud and roller 63 that extends into an annular slot in the ring 53. When the lever 57 is swung by its pull rod 38, the ring 53 will be swung to rock the cleat arms 52 as indicated in Figs. 6 and 7. Here too, a bowed leaf spring 64 is mounted on the rib 54 for engagement with recesses 65 in the adjacent face of the ring 53, to yieldably hold the cleats out of ground-engaging position when they are disengaged from the wheel.

While the cleats 66 are here shown as made integrally with their arms 52, they could be made separately and connected to their arms by bolts such as the bolts 25. The cleats and their arms are preferably made of spring steel, so that they will yield under tractive forces and under radial pressure that results from flattening of the tire tread. The bowed portion 67 of the cleat provides for better flexibility without undue stress or deformation in case the tire becomes unduly soft or flat. In this case as in the structures of Figs. 1 to 3, the inherent resiliency of the cleat arms 52 and the cleats 66 will result in their being restored to normal position on the tire tread upon release from the roadway.

The cleat arms 52 can conveniently be replaced when worn, because their knuckles 68 are partly open, so that when pins 69 that connect the links 56 to the arms 52 are removed, the worn cleat arm can be swung to approximately the horizontal position for disengagement of the knuckle 68 with its hinge pin. The degree of curvature of the knuckle 68 is such that it cannot become accidentally disengaged when the cleat arm is connected to the link.

I claim as my invention:

1. Antiskid apparatus comprising a stationary base member adapted for mounting on a fixed part of a vehicle, a cleat ring supported thereon for movement coaxial with a wheel with which the apparatus is associated, a second ring rotatable with the cleat ring, cleat-carrying arms pivotally supported on the cleat ring, links pivotally connected to said arms and the second-named ring, and means for shifting the said second ring axially of the cleat ring toward and from a wheel with which the apparatus is associated.

2. Antiskid apparatus comprising a stationary base member adapted for mounting on a fixed part of a vehicle, a cleat ring supported thereon for movement coaxial with a wheel with which the apparatus is associated, a second ring rotatable with the cleat ring, cleat-carrying arms pivotally supported on the cleat rings, links pivotally connected to said arms and the second-named ring, and means for shifting the said second ring axially of the cleat ring toward and from a wheel with which the apparatus is associated, the shifting means comprising a camming device connected to the said second ring and mounted for oscillatory movement by a pull rod.

3. Antiskid apparatus comprising a stationary base member adapted for mounting on a fixed part of a vehicle, a cleat ring supported thereon for movement coaxial with a wheel with which the apparatus is associated, a second ring rotatable with the cleat ring, cleat-carrying arms pivotally supported on the cleat ring, links pivotally connected to said arms and the second-named ring, means for shifting the said second ring axially of the cleat ring toward and from a wheel with which the apparatus is associated, and means yieldably holding the said rings at a predetermined rotative position on the base, when the cleat arms are in withdrawn position.

4. Antiskid apparatus comprising a stationary base member of cylindrical form adapted to be mounted on a vehicle, in proximity to and coaxial with a vehicle wheel, guide ribs disposed circumferentially of the base member, a cleat-carrying ring loosely fitting between two of the ribs, a second ring rotatable on the base member, synchronously with the cleat ring, cleat arms pivotally connected to the cleat ring, links each pivotally connected at its ends to the cleat arms and the second ring, an annular slot in the second ring, a shifting member engageable in the slot, and means for moving said member axially of the cleat ring, in directions to shift the said second-named ring and rock the cleat arms about their pivots.

WILLIAM GEORGE HARDY.

REFERENCES CITED

The following references are of record in the file of this patent:

UNITED STATES PATENTS

| Number | Name | Date |
|---|---|---|
| 1,256,160 | Parish | Feb. 12, 1918 |
| 1,787,608 | Ansell | Jan. 6, 1931 |
| 2,195,982 | Daley | Apr. 2, 1940 |